US007548377B2

(12) United States Patent
Berge

(10) Patent No.: US 7,548,377 B2
(45) Date of Patent: *Jun. 16, 2009

(54) DROP CENTERING DEVICE

(75) Inventor: Bruno Berge, Reaumont (FR)

(73) Assignee: Varioptic S.A., Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/589,277

(22) Filed: Oct. 30, 2006

(65) Prior Publication Data

US 2007/0103790 A1 May 10, 2007

Related U.S. Application Data

(63) Continuation of application No. 10/812,307, filed on Mar. 20, 2004, now abandoned, which is a continuation-in-part of application No. PCT/FR98/02143, filed on Oct. 7, 1998, and a continuation-in-part of application No. 09/529,193, filed as application No. PCT/FR98/02143 on Oct. 7, 1998, now Pat. No. 6,369,954, said application No. 10/812,307 is a continuation of application No. 09/937,508, filed as application No. PCT/FR00/00751 on Mar. 24, 2000, now Pat. No. 7,443,596.

(30) Foreign Application Priority Data

| | | | |
|---|---|---|---|
| Oct. 8, 1997 | (FR) | .................................. | 97/12781 |
| Mar. 26, 1999 | (FR) | .................................. | 99/03980 |

(51) Int. Cl.
*G02B 3/12* (2006.01)

(52) U.S. Cl. ...................................................... 359/665

(58) Field of Classification Search ................. 359/666; 264/1.1, 1.32, 1.36, 1.7; 73/432.1
See application file for complete search history.

(56) References Cited

U.S. PATENT DOCUMENTS

| | | | | |
|---|---|---|---|---|
| 4,030,813 | A | 6/1977 | Kohashi et al. | |
| 5,659,330 | A | 8/1997 | Sheridon | |
| 5,687,401 | A | 11/1997 | Kawamura et al. | |
| 5,745,255 | A | 4/1998 | Yamaguchi | |
| 6,369,954 | B1 * | 4/2002 | Berge et al. | ................. 359/666 |
| 6,449,081 | B1 | 9/2002 | Onuki et al. | |
| 6,545,815 | B2 | 4/2003 | Kroupenkine et al. | |
| 6,545,816 | B1 | 4/2003 | Kroupenkine et al. | |

(Continued)

FOREIGN PATENT DOCUMENTS

DE 197 10 668 A1 9/1998

(Continued)

OTHER PUBLICATIONS

U.S. Appl. No. 10/819,888, filed Apr. 2004, Berge et al.

(Continued)

*Primary Examiner*—Darryl J Collins
(74) *Attorney, Agent, or Firm*—Osha • Liang LLP

(57) ABSTRACT

A method for centering a drop of liquid on a given point on a surface. The inventive method consists in forming a bell-mouthed recess, whereby said recess has a curvature at any point at the limit of contact between the drop and the recess that is lower than or opposite to the curvature of a circle (TC) that is tangent to the surface of the recess to said point and at a symmetrical point (CP2) of said surface.

10 Claims, 3 Drawing Sheets

U.S. PATENT DOCUMENTS

| | | | | |
|---|---|---|---|---|
| 6,702,483 | B2 | 3/2004 | Tsuboi et al. | |
| RE39,874 | E * | 10/2007 | Berge et al. | 359/666 |
| 2002/0196558 | A1 | 12/2002 | Kroupenkine et al. | |
| 2005/0088754 | A9 | 4/2005 | Kroupenkine | |
| 2006/0209422 | A1 * | 9/2006 | Renders et al. | 359/665 |
| 2008/0030870 | A1 * | 2/2008 | Bruno et al. | 359/666 |

FOREIGN PATENT DOCUMENTS

| | | | |
|---|---|---|---|
| FR | 2769375 | A1 | 4/1999 |
| JP | 7-5497 | | 1/1995 |
| JP | 7-128635 | | 5/1995 |
| JP | 9-15681 | | 1/1997 |
| JP | 9-236740 | | 9/1997 |
| JP | 3-87816 | | 9/2000 |
| WO | WO 96/41227 | A1 | 12/1996 |
| WO | WO 97/43731 | | 11/1997 |
| WO | WO 99/18456 | | 4/1999 |

OTHER PUBLICATIONS

J.A.M. Sondag-Huethorste et al., "Electrical Double Layers on Thiol-Modified Polycrystalline Gold Electrodes", Journal of Electroanalytical Chemistry, 367, 1994, pp. 49-57.

N.K. Sheridon, "Electrocapillary Imaging Devices for Display and Data Storage", Xerox Disclosure Journal, vol. 4, No. 3, May/Jun. 1979.

J.A.M. Sondag-Huethorst et al, "Potential-Dependent Wetting of Electroactive Ferrocene-Terminated Alkanethiolate Monolayers on Gold", Langmuir, vol. 10, No. 11, American Chemical Society, 1994, pp. 4380-4387.

R. Graham, "A Variable Focus Lens and Its Uses", J. Opt. Soc. Am., vol. 30, 1994, pp. 560-563.

W.J.J. Welters et al., "Fast Electrically Switchable Capillary Effects", Langmuir, 1998, pp. 1535-1538.

J.L. Jackel et al., "Electrowetting Switch for Multimode Optical Fibers", Appl. Opt., vol. 22, No. 11, Jun. 1, 1983, pp. 1765-1770.

E. Colgate et al., "An Investigation of Electrowetting-based Microactuation", J. Vac. Sci. Technol., 1990, pp. 3625-3632.

M. Vallet et al., "Electrowetting of Water and Aqueous Solutions on Poly(ethylene terephthalate) Insulating Films", Polymer, vol. 37, No. 12, 1996, pp. 2465-2470.

G. Beni et al., "Electro-wetting Displays", Appl. Phys. Lett., vol. 38, No. 4, Feb. 15, 1981, pp. 207-209.

L.G. Commander et al., "Microlenses Immersed in Nematic Liquid Crystal with Electrically Controllable Focal Length", Third European Optical Soc. Topical Meeting, May 11-12, 1995.

M. Sato, "Electrocapillarity Optical Switch", IEICE Trans. Commun., vol. E77-B, No. 2, Feb. 1994, pp. 197-203.

G. Beni et al., "Dynamics of Electrowetting Displays", J. Appl. Phys., vol. 52, No. 10, Oct. 1981, pp. 6011-6015.

G. Lippmann, "Relations Entre Les Phenomenes Electroniques Et Capillaires", Ann. Chim. Phys., 1875, pp. 494-549.

B. Berge, "Electrocapillarite Et Mouillage De Films Isolants Par L'eau", C. R. Acad. Sci. Paris 317, Ser. II, 1993.

A. Froumkine, "Couche Double, Electrocapillarite, Surtension", Actual Sci., 1936.

* cited by examiner

DROP CENTERING DEVICE

This application is a continuation/divisional of copending application Ser. No. 10/812,307, filed Mar. 30, 2004, which is a continuation/divisional of application Ser. No. 09/937,508, filed May 22, 2002, which was filed as a national stage application of International Application No. PCT/FR00/00751, filed Mar. 24, 2000, which claims the right of priority based on French Patent Application No. 99/03980, filed Mar. 26, 1999. This application is also being filed as a continuation-in-part of International Application No. PCT/FR98/02143, which was filed Oct. 7, 1998, which was copending with International Application No. PCT/FR00/00751, and is also being filed as a continuation-in-part of application Ser. No. 09/529,193, which was filed Jul. 25, 2000, as a § 371 national stage application of International Application No. PCT/FR98/02143 and which was also copending with International Application No. PCT/FR00/00751. Application Ser. No. 09/529,193, and its corresponding International Application No. PCT/FR98/02143, claim the right of priority based on French Patent Application No. 97/12781, filed Oct. 8, 1997, the former now issued as U.S. Pat. No. 6,369,954.

The present invention relates to the maintaining of a liquid drop in a predetermined position on a solid surface, and more specifically to the centering of such a drop.

For various reasons, it may be desired to maintain a drop laid on a surface, accurately centered on a predetermined axis. A known way (by the inventor) consists of modifying around this axis the surface wetability with respect to the drop liquid.

FIG. 1 shows a side cross-section view of a liquid drop 2 laid on a surface 4. Surface 4 has been processed in a circular area Cl centered on an axis O. The processing of area Cl is such that its wetability with respect to the liquid of drop 2 is strong. Thus, capillarity forces maintain drop 2 centered on axis O.

An improvement (of the inventor), not shown, of such a surface processing consists of creating around axis O several concentric circular areas. The processing of these areas then is such that the closer an area is to axis O, the more its wetability with respect to the liquid of drop 2 is strong. Such an improvement enables centering drop 2 for different contact angles. This is particularly advantageous when a way of changing said angle is available, for example by means of an electric voltage. Such surface processings may however be difficult and expensive to implement.

An object of the present invention is to center a drop laid on a surface without using a modification of the surface wetability.

To achieve this object, the present invention provides a method for centering a liquid drop at a given location of a surface, which consists of forming at this location a flared hollow such that, at any point of the contact limit between the drop and the hollow, said hollow has a curvature smaller than or opposite to that of a circle tangent to the hollow surface at said point and at a symmetrical point of this surface.

According to an embodiment of the present invention, the flared hollow has the shape of a truncated cone with an axis perpendicular to said surface.

According to an embodiment of the present invention, the flared hollow has the shape of the upper central portion of a torus having an axis perpendicular to the surface.

According to an embodiment of the present invention, a method for centering a liquid drop on the external surface of a convex surface is provided, which consists of giving this surface at any point of the contact limit with the drop a shape such that this surface has a curvature greater than that of a circle tangent to this surface at this point and at a symmetrical point of this surface.

According to an embodiment of the present invention, the convex surface is formed by revolution against said axis of an arc of a circle having a radius smaller than that of said tangent circle.

The present invention also provides a variable-focus lens implementing the above-mentioned method, which includes a wall made of an isolating material, a drop of a first isolating liquid arranged on an area of a first surface of the wall, a second conductive liquid covering the first surface and the drop, the first and second liquids being non-miscible, having different optical indexes and substantially the same density, and means for applying an electric voltage between the conductive liquid and an electrode arranged on the second surface of said wall, the drop being placed in a flared hollow of the wall.

According to an embodiment of the present invention, the electrode is a sheet metal, the flared hollow is a truncated cone formed by embossing said sheet metal, centered on an axis perpendicular to the first surface, and the bottom of which is pierced with a centered hole, and the isolating material wall is a transparent plastic film flattened against the electrode and the walls of the hollow, and which covers said hole.

According to an embodiment of the present invention, the electrode is a sheet metal, the flared hollow is a truncated cone formed by machining said sheet metal, centered on an axis perpendicular to the first surface, and the bottom of which is pierced with a centered hole, and the isolating material wall is a transparent plastic film flattened against the electrode and the walls of the hollow, and which covers said hole.

The foregoing objects, features and advantages of the present invention, will be discussed in detail in the following non-limiting description of specific embodiments in connection with the accompanying drawings.

FIG. 1, previously described, shows a side cross-section view of a drop-centering means according to prior work of the present inventor;

Same elements have been designated with same references in the following drawings. In particular, reference 2 will designate a liquid drop of small dimensions, having its position on a surface essentially defined by the capillarity forces (the surface tension). Reference 4 will designate a surface, the wetability of which is constant with respect to the liquid of drop 2.

Figure 2:
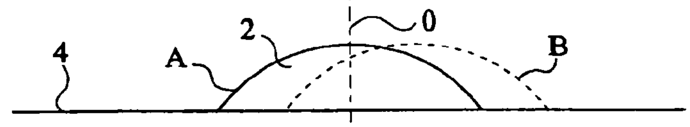
FIG. 2 shows a side cross-section view of a liquid drop laid on a planar surface.

FIG. 2 shows a planar surface 4 cut by an axis O perpendicular to this surface. If a liquid drop is desired to be placed at a position A centered on axis O, for example, by being deposited from a drop-grasping rod, the chances of achieving this with precision are small, the drop remaining where it has been laid, for example, at a position B.

Figure 3:
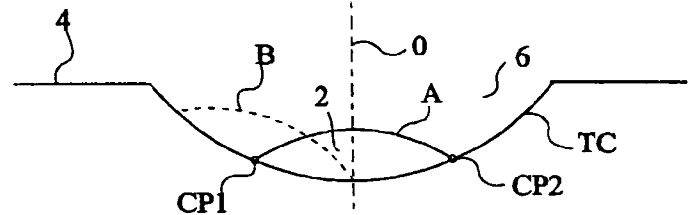
FIGS. 3 to 7 are side cross-section views of a liquid drop placed in a flared hollow of a surface.

As illustrated in FIG. 3, to solve the problem of the centering of a drop 2 with respect to an axis O, the present inventor has first thought of placing drop 2 in a hollow formed in surface 4, this hollow having the shape of a spherical cap symmetrical with respect to axis O. However, any position of drop 2 in hollow 6 has appeared to be a stable position. Thus, as in the case of a planar surface 4, if drop 2 is desired to be placed at a position A centered on axis O, the chances of achieving this with precision are small since the drop will remain where it has been laid, for example, at a position B.

Figure 1:
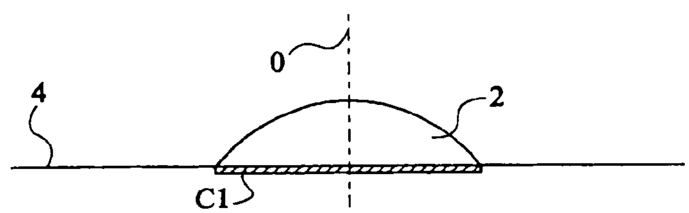

French patent application number 97/12781 (corresponding to U.S. Pat. No. 6,369,954) deposited by the present applicant describes a variable-focus liquid lens formed by a liquid drop laid at the surface of a solid, centered on an axis by the means described in relation with FIG. 1. This application further describes electromagnetic means for deforming the drop while maintaining it centered on the axis. On the other hand, this patent application describes a variable-focus liquid lens formed by a liquid drop contained in a tube and maintained centered on the tube axis by capillarity. There thus appears that a drop 2 can be centered on an axis O by being placed in a cylindrical hollow of surface 4, centered on this axis. However, it is difficult to place a liquid drop in such a cylindrical hollow while avoiding for a bubble to remain at the drop basis.

First, the present inventor has thus abandoned the idea of centering a drop by means of a hollow. Thus, French patent application number 97/12781 deposited by the present applicant describes a variable-focus liquid lens formed by a liquid drop laid at the surface of a solid, centered on an axis by the means described in relation with FIG. 1. This application further describes electromagnetic means for deforming the drop while maintaining it centered on the axis.

On the other hand, this patent application describes a variable-focus liquid lens formed by a liquid drop contained in a tube and maintained centered on the tube axis by capillarity. There thus appears that a drop 2 can be centered on an axis 0 by being placed in a cylindrical hollow of surface 4, centered on this axis. However, it is difficult to place a liquid drop in such a cylindrical hollow while avoiding for a bubble to remain at the drop basis.

The present inventor has then systematically searched which type of hollow centered on an axis O enables easy centering of a liquid drop on this axis.

FIGS. 4 to 7 each represent a side cross-section view of a liquid drop 2 placed in a flared hollow 6 centered on an axis O and formed in a surface 4. For a position A of drop 2, centered on axis O, CP1 designates any point of the contact limit between drop 2 and the surface of hollow 6. The circle having its center located on axis O, and which is tangent to the surface of the hollow both at point CP1 and at a symmetrical point CP2, is called the tangent circle TC.

Figure 4:
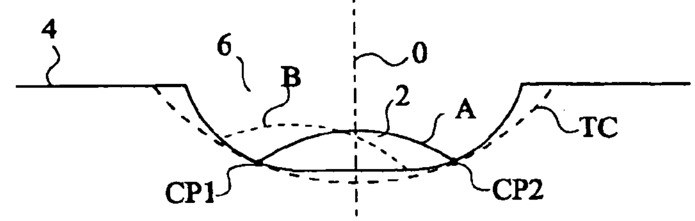

FIG. 4 represents a liquid drop 2 placed in a hollow 6 formed by the revolution around axis O of an arc of a circle having a radius smaller than that of previous circle TC. Thus, at any point CP1 of the contact limit between the hollow surface and the drop, the surface curvature of the hollow is greater than that of circle TC.

Figure 5:
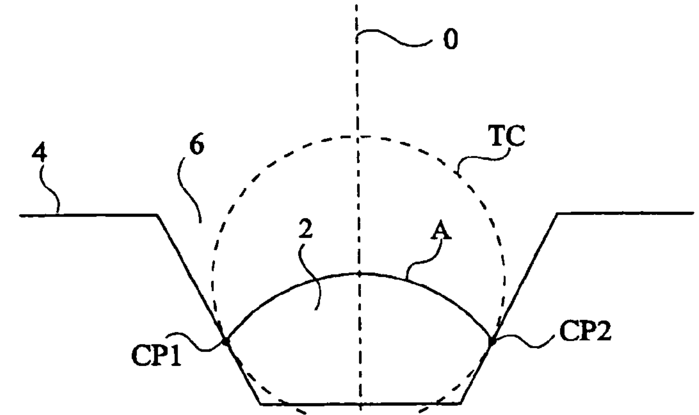

FIG. 5 shows a liquid drop 2 placed in a hollow 6 formed by revolution of a segment around axis O. Hollow 6 is a truncated cone. Thus, at any point CP1 of the contact limit with the drop, the surface curvature of hollow 6 is null, smaller than that of tangent circle TC.

Figure 6:
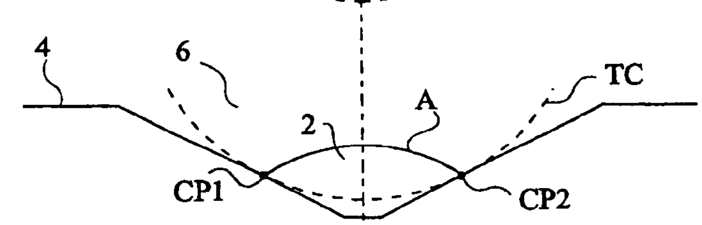

FIG. 6 shows a liquid drop 2 placed in a hollow 6 formed by revolution around axis O of an arc of a circle greater than that of previous circle TC. Thus, at any point CP1 of the contact limit with the drop, the surface curvature of the hollow is smaller than that of tangent circle TC.

Figure 7:
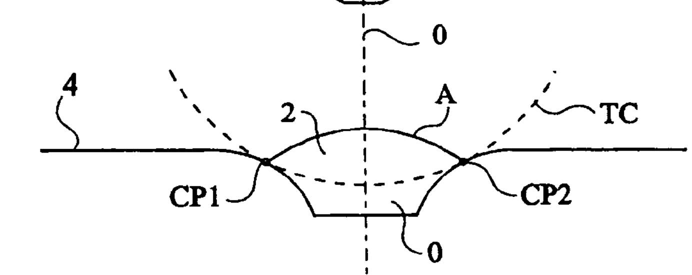

FIG. 7 shows a liquid drop 2 placed in a hollow 6 formed by revolution around axis O of an arc of a circle having a curvature opposite to that of tangent circle TC. Hollow 6 corresponds to the central upper portion of a torus. At any point CP1 of the contact limit with the drop, the surface curvature of hollow 6 is opposite to that of tangent circle TC.

The present inventor has shown that, for a drop 2 placed in a flared hollow 6 centered on an axis O, the surface curvature of hollow 6 at any point CP1 of the contact limit with the drop determines whether a position A of the drop centered on axis O is a position of equilibrium or not.

Thus, when, as in FIGS. 5, 6, and 7, the curvature at any point CP1 is smaller than or inverse to that of tangent circle TC, a drop placed in such a hollow naturally takes a position A centered on axis O.

On the other hand, when, as in FIG. 4, the curvature at any point CP1 is greater than that of tangent circle TC, a position A of the drop, centered on axis O, is particularly unstable and will not be able to be maintained. A drop placed in such a hollow naturally takes an out-of-center position B with respect to axis O.

Finally, when, as in FIG. 3, the curvature at any point CP1 is equal to that of tangent circle TC, any position of the drop is stable, and a drop placed in such a hollow at a position B brought out of center will keep this position.

Thus, the present invention provides a method for centering a drop at a given location of a surface consisting of forming at this location a flared hollow such that, at any point CP1 of the contact limit with the drop, this hollow has a curvature smaller than or opposite to that of tangent circle TC.

It should be noted that only the contact limit between the drop and the hollow surface counts. The shape of the hollow has no importance and it may be flat, convex, or concave.

According to another aspect of the present invention, a convex surface of uniform wetability centered on an axis O is considered, on which is laid a liquid drop, in a position A centered on axis O. The previously-described point CP1 and tangent circle TC are considered again.

Figure 8:
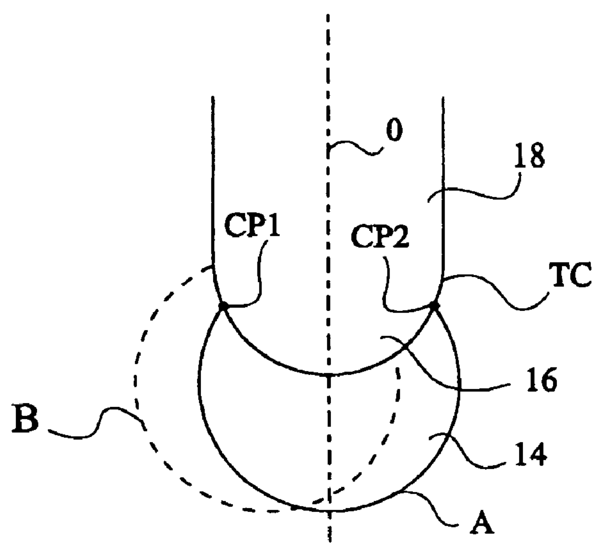
FIGS. 8 to 10 are side cross-section views of a liquid drop located at one end of a drop-grasping rod.
Figure 9:
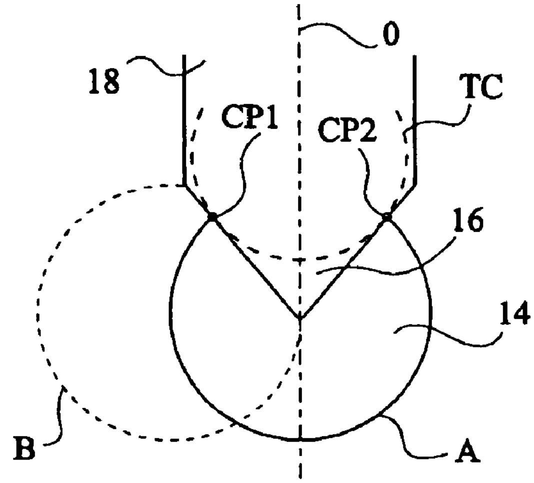
Figure 10:
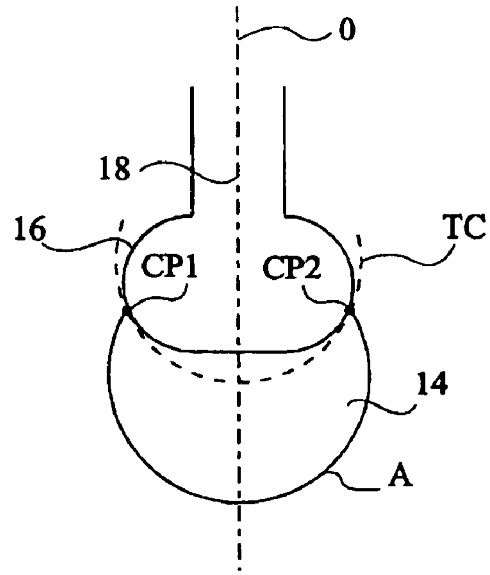

FIGS. 8 to 10 are side cross-section views of a liquid drop 14 placed on a convex surface 16 centered on an axis O.

FIG. 8 shows the case where the convex surface is spherical. The surface of sphere 16 at any point CP1 of the contact limit with drop 14 is always confounded with tangent circle TC.

In the case of FIG. 9, the convex surface is conical. The "curvature" of conical surface 16 at any point CP1 of the contact limit with drop 14 is always smaller than that of tangent circle TC.

In the case of FIG. 10, the convex surface is formed by revolution around axis O of an arc of a circle having a radius smaller than that of tangent circle TC. The surface curvature at any point CP1 of the contact limit with drop 14 is always greater than that of tangent circle TC.

The present inventor has shown that, for a drop 14 placed on a convex surface 16 centered on an axis O, the curvature at any point CP1 of the contact limit with the drop determines whether a position A of the drop, centered on axis O, is a position of equilibrium of not.

Thus, when, as in FIG. 10, the curvature at any point CP1 is greater than that of tangent circle TC, a drop placed on such a surface naturally takes a position A centered on axis O.

However, as in FIG. 9, the curvature at any point CP1 is smaller than that of tangent circle TC, a position A of the drop, centered on axis O, is unstable. A drop placed on such a surface naturally takes a position B brought out of center with respect to axis O.

Finally, when, as in FIG. 8, the curvature at any point CP1 is equal to that of tangent circle TC, any position of the drop is stable, and a drop placed at an out-of-center position B will keep this position.

Thus, the present invention provides a method for centering a drop on a convex surface which consists, at any point CP1 of the contact limit with the drop, of giving the surface a curvature greater than that of tangent circle TC.

According to an application of this method, convex surface 16 forms the end of a rod 18 for grasping a drop 14. Indeed, for certain chemical or biological handling operations, it is desirable to have drop-grasping rods which enable precisely and reliably handling liquid drops. A drop-grasping rod, the end of which is formed according to the present invention, enables conveying definitely centered drops.

An application of the present invention to the forming of a means for centering a liquid drop used as an optical lens will now be described.

Figure 11:
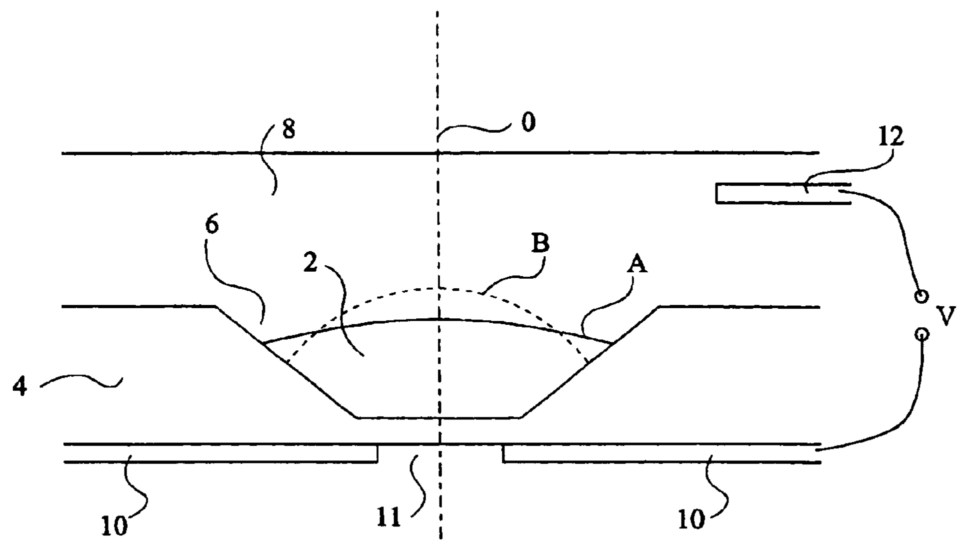
FIG. 11 shows a side cross-section view of an application of the present invention to the centering of a transparent liquid drop used as a lens.

FIG. 11 shows a simplified cross-section view of such a variable-focus liquid lens, formed in a dielectric enclosure 4 filled with a conductive liquid 8. Dielectric 4 naturally has a low wetability with respect to conductive liquid 8. A lower surface of a wall of enclosure 4 includes a hollow 6, centered around an axis O perpendicular to this wall. Hollow 6 is a truncated cone according to the present invention, such as that shown in FIG. 5. A drop of an isolating liquid 2 is placed in hollow 6. As seen previously, isolating liquid drop 2 naturally takes a position A centered on axis O. Isolating liquid 2 and conductive liquid 8 are both transparent, non-miscible, they have different optical indexes and have substantially the same density. The dioptre formed between liquids 8 and 2 forms a surface of a liquid lens, the optical axis of which is axis O and the other surface of which corresponds to the contact between the drop and the bottom of the hollow. As electrode 10, including a hole 11 in the vicinity of axis O, is placed on the external surface of dielectric enclosure 4. As electrode 12 is in contact with conductive liquid 8. Electrode 12 may be immersed in liquid 8, or be a conductive deposition performed on an internal wall of enclosure 4. A voltage source (not shown) enables applying a voltage V between electrodes 10 and 12.

Voltage V may be increased from O volt to a maximum voltage, which depends on the used materials. When the voltage increases, isolating liquid drop 2 deforms to reach a limiting position (designated with reference B). While drop 2 deforms from its position A to its position B, the focus of the liquid lens varies.

It should be noted that, drop 2 being an isolating liquid, no microdrops occur at its periphery when voltage V is high, conversely to what would occur if the drop was a conductive liquid.

The conical shape of hollow 6 is such that, whatever the shape of drop 2 that it contains, the curvature of its surface at any contact point between the limit of the drop and the surface is smaller than that of a tangent circle TC crossing this point. Thus, according to an aspect of the present invention, hollow 6 is such that, all along its deformation from its position A to its position B, liquid drop 2 is continuously maintained centered on axis O. A liquid lens with a accurately fixed optical axis and with a focus varying with voltage V is thus available.

It should be noted that a hollow 6 according to the present invention, which ensures the continuous centering of liquid drop 2, is relatively simple to implement and that it advantageously replaces the electromagnetic centering means or the surface processing centering means described in above-mentioned French patent application.

An A.C. voltage will preferably be used for voltage V, to avoid the accumulation of electric loads across the thickness of material 4, from the surface on which is laid drop 2.

As an example, water charged with salts (mineral or others) or any liquid, organic or not, which is conductive or made such by addition of ionic components may be used as a conductive liquid 8. For isolating liquid 2, oil, an alkane or a mixture of alkanes, possibly halogenated, or any other isolating liquid non miscible with conductive liquid 8 may be used. Dielectric wall 4 may be a glass plate or a superposition of fluorinated polymer, epoxy resin, polyethylene. Electrode 10 may be a metal deposition.

Figure 12:
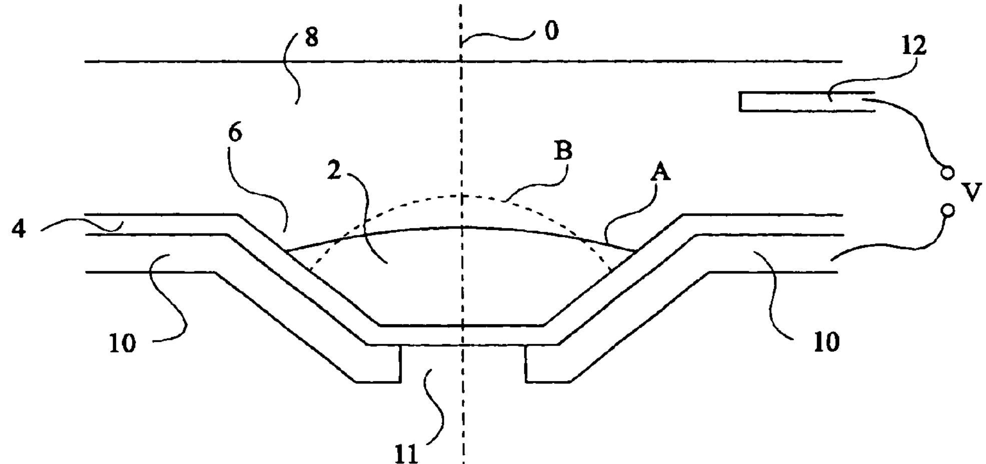
FIG. 12 shows a side cross-section view of an alternative of FIG. 11.

FIG. 12 shows a simplified cross-section view of an alternative embodiment of the variable-focus liquid lens of FIG. 11. Same references designate same elements in FIGS. 11 and 12. In this embodiment, electrode 10 may be a metal sheet in which hollow 6 is formed by embossing. It may also be a metal wall in which hollow 6 has been formed by machining, then polishing. Wall 4 then is, for example, a thin transparent plastic film flattened against electrode 10 and which covers hole 11. This plastic film may for example be flattened by thermoforming.

In the example of application of FIG. 12, drop 2 has an idle diameter of approximately 1 to 5 mm. Conductive liquid 8 and the isolating liquid of drop 2 being substantially of same density, drop 2 has the shape of a spherical cap. When idle (position A), the edge of drop 2 makes an angle of approximately 45 degrees with the surface of hollow 6, if the latter is a cone having a 45-degree slope. In its limiting position (position B), the edge of drop 2 makes an angle of approximately 90 degrees with the surface of enclosure 4. The described device, using as a conductive liquid 8 salt water having an optical index 1.35 and, as the isolating liquid of drop 2, oil with optical index 1.45, enables obtaining approximately 30 diopters of focus variation for an applied voltage of 250 V and a dissipated electric power of a few mW. The frequency of the A.O. voltage ranges in this case between 100 and 10,000 Hz, its period being much smaller than the system response time of approximately a few hundredths of a second.

The variable-focus lens according to the present invention may have a size ranging between a few hundreds of μm and a few tens of mm and may in particular be applied to the field of optoelectronic, endoscopy, imaging and vision systems.

Of course, the present invention is likely to have various alternatives and modifications which will occur to those skilled in the art. In particular, the present description has been made in relation with hollows having a circular cross-section, that is, formed by rotation around an axis O. However, elongated hollows having the shape of a channel may for example be provided. In this case, FIGS. 5 to 7 will be considered as describing the cross-section view of a channel, and axis O will represent the symmetry plane of said channel.

On the other hand, a hollow 6 with a flat bottom has been shown in FIG. 11, which results in a plano-convex lens. Now, it has been seen that the shape of the bottom of hollow 6 does not influence its properties of centering of drop 2. Thus, biconvex or meniscus lenses may easily be formed by modifying the curvature of the bottom of hollow 6.

On the other hand, also, an embodiment of a variable-focus lens using a conical hollow such as in FIG. 5 has been shown in FIGS. 11 and 12, but the present invention will easily be adapted to a variable-focus lens using another shape of hollow according to the present invention.

Finally, a device including a network formed of groups of three separately-controlled variable-focus lenses, red-, green- and blue-colored, operating for example in all or nothing, enabling letting through or stopping the light coming from a single white light source may be formed, thus forming an illuminated color screen that can be very large and of low cost.

The invention claimed is:

1. An optical element having an optical axis, comprising:

a container;

a first liquid and a second liquid contained in said container; and a ring-shaped electrode surrounding at least one of said first liquid and said second liquid;

wherein said first liquid and said second liquid are immiscible, form a curved boundary, and have different refractive indices.

2. An optical element according to claim 1, wherein the container has a side surface that is contacted by said curved boundary.

3. An optical element according to claim 2, wherein said side surface is arranged in such a way as to orient said first and second liquids with respect to the optical axis.

4. An optical element according to claim 3, wherein the side surface of the container is arranged substantially parallel to the optical axis.

5. An optical element according to claim 3, wherein the side surface of the container is arranged at an angle with respect to the optical axis.

6. An optical element according to claim 5, wherein the angle is 45 degrees.

7. An optical element according to claim 2, wherein the side surface of the container comprises a wall made of an insulating material.

8. An optical element according to claim 1, wherein the optical element is a variable-focus lens.

9. An optical system in which light is converged by a lens element, said optical system comprising the optical element of claim 1.

10. A method of changing the focus of a variable focus lens of the type comprising an optical element as defined by claim 1 and a voltage source, the method comprising:

selectively applying a voltage differential between the first liquid and the wall sufficient to change the wetability of the first liquid with respect to the wall to change the shape of the body of the first liquid; and using the change in the shape of the body of first liquid to change the shape of the curved boundary between the first and second liquids.

* * * * *